No. 822,175. PATENTED MAY 29, 1906.
E. R. WOLCOTT.
PROCESS OF LOCATING AND EXTRACTING METALS BENEATH THE EARTH'S SURFACE.
APPLICATION FILED SEPT. 5, 1905.
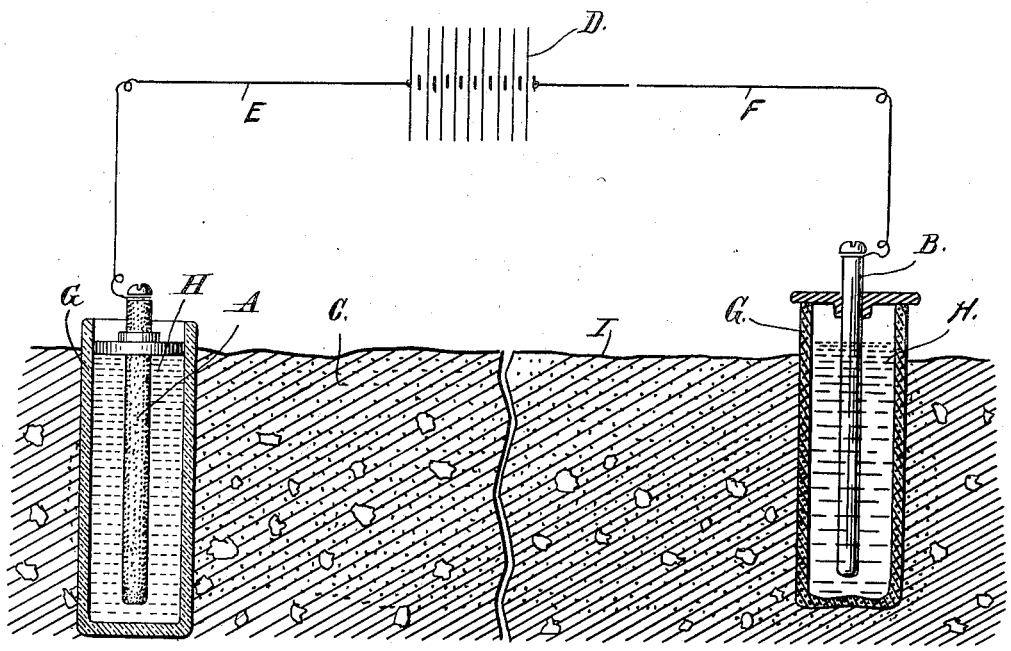
Witnesses
Otto E. Hoddick.
Dena Nelson.
E. R. Wolcott.
Inventor
by
Attorney

UNITED STATES PATENT OFFICE.

EDSON R. WOLCOTT, OF GOLDEN, COLORADO.

PROCESS OF LOCATING AND EXTRACTING METALS BENEATH THE EARTH'S SURFACE.

No. 822,175.  Specification of Letters Patent.  Patented May 29, 1906.

Application filed September 5, 1905. Serial No. 276,931.

*To all whom it may concern:*

Be it known that I, EDSON R. WOLCOTT, a citizen of the United States, residing at Golden, in the county of Jefferson and State of Colorado, have invented a certain new and useful Process of Locating and Extracting Metals Beneath the Earth's Surface; and I do declare the following to be a full, clear, and exact description of the invention, such as will enable others skilled in the art to which it appertains to make and use the same, reference being had to the accompanying drawing, and to the letters of reference marked thereon, which forms a part of this specification.

This invention consists of a process of locating and also extracting metals beneath the earth's surface. The process consists in placing electrodes (anode and cathode) in the ground at a suitable distance from each other, moistening the earth between the electrodes, if necessary saturating the earth with acids adapted to dissolve the metals contained in the earth, and, finally, passing a current of electricity from the anode to the cathode. In this event the dissolved metals will be carried along with the electrical current and deposited at or upon the cathode.

The invention will be understood by reference to the accompanying drawing, which is a section of the earth, showing suitable apparatus in place for carrying out the process. The drawing is principally diagrammatic.

In the drawing, A and B designate the anode and cathode; C, the earth containing the metals to be located and extracted; D, a source of electricity; E and F, conductors leading from the pole of the source of electricity to the anode and cathode, respectively. The electrodes are preferably inserted in porous jars G, containing an electrolyte H. The anode is also preferably placed in a porous jar when the circumstances are such that there is to be a deposition of a substance or substances at the anode. The surface of the earth is indicated by the line I.

When an electric current flows between two electrodes embedded in moist earth, as between A and B, (referring to the drawing,) such metallic ions as are in solution adjacent to the electrodes act as carriers of the electricity and are deposited on the cathode according to the laws of electrolysis after having been forced through the earth according to the principles of electrical endosmosis. The earth here acts as the porous body and the solution is forced through it in a manner similar to the way in which solution is forced through capillary tubes or a porous jar by an electrical current. In case there are present bodies of metal or their ores not in solution, by pouring a suitable solution upon the surface it diffuses and eventually dissolves the metals or ores and ions are formed.

By changing the position of the electrodes and noting the relation between the quantity of electricity used and the quantity of the deposit formed the location of the body of metal or ore can be determined—that is, when the body of metal or ore is exactly between the electrodes a smaller quantity of electricity suffices to produce the same quantity of metallic deposit, since when the body of metals or ores is at a greater distance from the electrodes a smaller number of the metallic ions would act as carriers, and hence a greater quantity of electricity would be required to flow before the same quantity of the metallic deposit would be formed.

This invention therefore embodies a process of locating bodies of metals or metallic ores, and also a process of extracting the metals (as pure metals or as their compounds) from the earth. The porous jar G preferably surrounds the cathode to prevent direct contact between it and the earth, as some of the deposit might thereby be lost. Under certain conditions the deposit does not adhere firmly to the cathode, and when the latter is placed in a porous jar the vessel retains all deposit that may be precipitated from the solution or that may fall from the cathode. Such a jar may be made from unglazed porcelain. It contains a suitable electrolyte H. For instance, if it is desired to determine the quantity of deposit formed and the conditions are such as to permit a firm adherence of the deposit an electrolyte would be used which did not dissolve the deposit and did not itself give an adhering deposit.

The same invention could be used at great depths by running insulated wires to such depths and attaching proper electrodes to the same. The anode should consist, preferably, of a non-decomposable conductor— namely, carbon—while platinum answers the purpose of a cathode where quantitative results are desired, although numerous less expensive metals could be used at other times.

The distance between the electrodes, the current strength, and the potential difference between the electrodes are factors to be adjusted to individual cases, as is also the kind of electrodes, the kind of solution used in dissolving the metals or ores, the electrolyte around the cathode, and the porous substance which surrounds the electrode. The same process can be used for locating and obtaining deposits of non-metals or acid radicals. These would be deposited at the anode.

Having thus described my invention, what I claim is—

1. A process of locating metals beneath the surface of the earth consisting in placing electrodes having the relation of anode and cathode in the earth and passing an electric current between them and causing the metals in solution in the vicinity of the electrodes to move through the earth and be deposited upon the cathode, substantially as described.

2. The herein-described process of locating metals, consisting in placing electrodes in the earth, moistening the earth between the electrodes and passing a current of electricity from the anode to the cathode whereby the metals in the vicinity are caused to travel toward and deposited at or upon the cathode.

3. The herein-described process consisting in placing electrodes having the relation of anode and cathode, in the earth, saturating the earth with a suitable substance to dissolve the metals in the vicinity of the electrodes, and passing a current of electricity from the anode to the cathode whereby the dissolved metals are deposited at or upon the cathode.

4. The herein-described process of locating and extracting metals, consisting in placing electrodes having the relation of anode and cathode in the earth, surrounding the cathode by a porous jar containing a suitable electrolyte, applying a solution to the earth in the vicinity of the electrodes, adapted to dissolve the metals contained therein, and finally passing a current of electricity from the anode to the cathode whereby the dissolved metals are deposited upon the cathode.

5. The herein-described process of locating and saving metals and such non-metals as can be electrolytically set free or precipitated by secondary reactions, said process consisting in placing in the earth electrodes having the relation of anode and cathode, surrounding each electrode by a porous jar containing a suitable electrolyte and passing a current of electricity from the anode to the cathode whereby the metals are deposited at or upon the cathode and the non-metals at or upon the anode.

6. The herein-described process consisting in placing electrodes in the earth and passing a current of electricity from the anode to the cathode whereby such non-metals in the vicinity as can be electrolytically set free or precipitated by secondary reactions, are caused to travel toward or deposited at or upon the anode.

7. The herein-described process of locating and saving such substance as can be electrolytically set free or precipitated by secondary reactions, said process consisting in placing in the earth electrodes having the relation of anode and cathode, surrounding each electrode by a porous jar containing a suitable electrolyte, and passing a current of electricity between the electrodes whereby the said substances are deposited at or upon the anode.

In testimony whereof I affix my signature in presence of two witnesses.

EDSON R. WOLCOTT.

Witnesses:
DENA NELSON,
A. J. O'BRIEN.